US011867620B2

(12) United States Patent
Cheng et al.

(10) Patent No.: US 11,867,620 B2
(45) Date of Patent: Jan. 9, 2024

(54) ULTRAFAST CHEMICAL IMAGING BY WIDEFIELD PHOTOTHERMAL SENSING OF INFRARED ABSORPTION

(71) Applicant: Purdue Research Foundation, West Lafayette, IN (US)

(72) Inventors: Ji-Xin Cheng, Newton, MA (US); Yeran Bai, Allston, MA (US); Delong Zhang, Brighton, MA (US); Ali Shakouri, West Lafayette, IN (US); D. Kerry Maize, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 92 days.

(21) Appl. No.: 17/600,438

(22) PCT Filed: Dec. 10, 2019

(86) PCT No.: PCT/US2019/065466
§ 371 (c)(1),
(2) Date: Sep. 30, 2021

(87) PCT Pub. No.: WO2020/123497
PCT Pub. Date: Jun. 18, 2020

(65) Prior Publication Data
US 2022/0381684 A1 Dec. 1, 2022

Related U.S. Application Data

(60) Provisional application No. 62/777,421, filed on Dec. 10, 2018.

(51) Int. Cl.
*G01N 21/3577* (2014.01)
(52) U.S. Cl.
CPC .................. *G01N 21/3577* (2013.01); *G01N 2201/06113* (2013.01)

(58) Field of Classification Search
CPC ..... G01N 21/3577; G01N 2201/06113; G01N 2021/1725; G01N 21/1717; G01N 21/171
See application file for complete search history.

(56) References Cited

U.S. PATENT DOCUMENTS

2004/0085540 A1\* 5/2004 Lapotko ............... G01N 21/171
356/432
2014/0240710 A1 8/2014 Shigekawa et al.
(Continued)

FOREIGN PATENT DOCUMENTS

| WO | WO 2018/102467 A1 | 6/2018 |
|---|---|---|
| WO | 2019232399 A1 | 12/2019 |
| WO | WO 2020/123497 A1 | 6/2020 |

OTHER PUBLICATIONS

Extended European Search Report issued in related application No. 19894833.3 dated Aug. 22, 2022.
(Continued)

*Primary Examiner* — Kiho Kim
(74) *Attorney, Agent, or Firm* — MERCHANT & GOULD P.C.

(57) ABSTRACT

Systems and methods for detecting photothermal effect in a sample are described herein. In these systems and methods, a pump source is configured to generate a pump pulse train, a probe source is configured to generate a probe pulse train and is synchronized with the pump pulse train, and a camera collects the resulting data. The camera is configured to collect a first signal corresponding to a hot frame, wherein the hot frame includes visible probe beam as modified by a pump beam and a second signal corresponding to a cold frame, wherein the cold frame includes visible probe beam that has not been modified by a pump beam. A processor can subtract the second signal from the first signal to detect the photothermal effect.

44 Claims, 8 Drawing Sheets

(56) References Cited

U.S. PATENT DOCUMENTS

| | | |
|---|---|---|
| 2016/0011049 A1 | 1/2016 | Furstenberg et al. |
| 2017/0211977 A1 | 7/2017 | Jeys et al. |
| 2018/0088041 A1 | 3/2018 | Zhang et al. |
| 2018/0156673 A1 | 6/2018 | Kendig et al. |

OTHER PUBLICATIONS

Bai Yeran et al., "Ultrafast chemical imaging by widefield photothermal sensing of infrared absorption", arXiv preprint, Nov. 18, 2018.

Yazawa Kazuaki et al., "Optical Pump-Probe Thermoreflectance Imaging for Anisotropic Heat Diffusion," 17th IEEE Intersociety Conference on Thermal and Thermomechanical Phenomena in Electronic Systems, May 29, 2018, pp. 59-66.

Tamamitsu, Miu, et al., "Quantitative phase imaging with molecular vibrational sensitivity", Optics Letters, vol. 44, No. 15, Aug. 1, 2019, 4 pgs.

International Preliminary Report on Patentability from PCT Application PCT/US2019/065466, dated Jun. 8, 2021, 14 pgs.

International Search Report and Written Opinion from PCT Application PCT/US2019/065466, dated Mar. 5, 2020, 17 pgs.

Khodadad, Davood, *Multiplexed Digital Holography incorporating Speckle Correlation*, Experimental Mechanics, Lulea University of Technology, as available at. https://www.researchgate.net/figure/Schematic-description-of-how-speckles-are-generated-left-Typical-speckle-pattern_fig1_293145586, Feb. 2016.

Teledyne, Teledyne Photometrics, Lenses and Optics, As available at https://www.photometrics.com/learn/microscopy-basics/lenses-and-optics, © 2023.

\* cited by examiner

ULTRAFAST CHEMICAL IMAGING BY WIDEFIELD PHOTOTHERMAL SENSING OF INFRARED ABSORPTION

RELATED APPLICATION

This application claims the benefit of U.S. Provisional Application No. 62/777,421 filed Dec. 10, 2018, which is hereby fully incorporated herein by reference.

TECHNICAL FIELD

Embodiments disclosed herein relate to investigating or analyzing materials by the use of optical means, i.e. using infra-red, visible or ultra-violet light. More particularly, embodiments relate to rapid detection of photothermal effect on a substrate that facilitates measurement of thermo-reflectance across a wide field to perform chemical bond analysis.

BACKGROUND

Vibrational imaging methods offer a new window to characterize samples based on spectroscopic signatures of chemical bonds. Raman and infrared (IR) spectroscopy have long been used to interrogate materials by probing molecular vibrations without exogenous labels.

Spontaneous Raman microscopy offers sub-micrometer spatial resolution imaging capability but suffers from the low acquisition rates. With the advent of coherent Raman scattering techniques, video-rate imaging speed has been demonstrated to characterize biological and pharmaceutical samples. However, detection of the extremely small Raman cross sections ($10^{-30}$ $cm^2sr^{-1}$) limits the sensitivity.

IR absorption offers larger cross sections ($10^{-22}$ $cm^2sr^{-1}$) that enables adequate sensitivity. Fourier-transform IR (FTIR) spectrometer, together with its attenuated total reflection accessories, is the typical instrument of the technique and has been extensively employed in the fields ranging from polymer science, pharmaceuticals to biological research. Coupling focal plane array detectors to FTIR systems allows simultaneously acquiring spatially resolved spectra, greatly improving the throughput for characterization of inhomogeneous samples. Unlike conventional FTIR instrumentation that operates based on interferometry and low-brightness globar excitation, discrete IR spectroscopic imaging techniques utilize tunable quantum cascade laser (QCL) with much higher photon flux per wavenumber, which enables real-time IR imaging. However, the long incident wavelengths in the mid-IR region limits the spatial resolution to several to tens of micrometers, which is not sufficient to resolve microstructures such as in biological cells.

To address the resolution issue, near-field approach provides a way to surpass the fundamental limitations by combing atomic force microscopy (AFM) with IR spectroscopy, where the AFM cantilever changes the oscillation amplitude due to the surface thermal expansion induced by the absorption of the mid-IR light. The spectra at nanoscale localization are obtained by recording the amplitude change while sweeping the wavelengths of the mid-IR light source. With the capability of providing high spatial resolution chemical mapping, AFM-IR has been a valuable tool to study block copolymer system where the domain size is typically at tens of nanometers. This technique shares the inherent drawback of tip-based imaging modality of low acquisition speed. Additionally, although some work showed the capability of investigating samples in aqueous environment using the total internal reflection of an IR prism to minimize the influence of water, sophisticated set-up and data processing procedure make it unsuitable for routine use.

It would be desirable to conduct ultrafast chemical imaging with improved resolution, which in some embodiments is capable of use in an aqueous environment, but none of the aforementioned solutions can accomplish this result.

SUMMARY

According to embodiments, a system for detecting photothermal effect in a sample includes a pump source configured to generate a pump pulse train, a probe source configured to generate a probe pulse train synchronized with the pump pulse train, and a camera. The camera is configured to collect a first signal corresponding to a hot frame, wherein the hot frame includes pulses of the probe beam as modified by a pump beam and a second signal corresponding to a cold frame, wherein the cold frame includes pulses of the probe beam that has not been modified by a pump beam. The system further includes a processor configured to determine the second signal from the first signal to detect the photothermal effect.

According to another embodiments, a method for detecting a photothermal effect in a sample comprises providing a pump pulse train, providing a probe pulse train synchronized with the pump pulse train, collecting a first signal corresponding to a hot frame, wherein the hot frame includes pulses of the probe beam as modified by a pump beam, collecting a second signal corresponding to a cold frame, wherein the cold frame includes pulses of the probe beam that has not been modified by a pump beam, and determining the second signal from the first signal to detect the photothermal effect.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
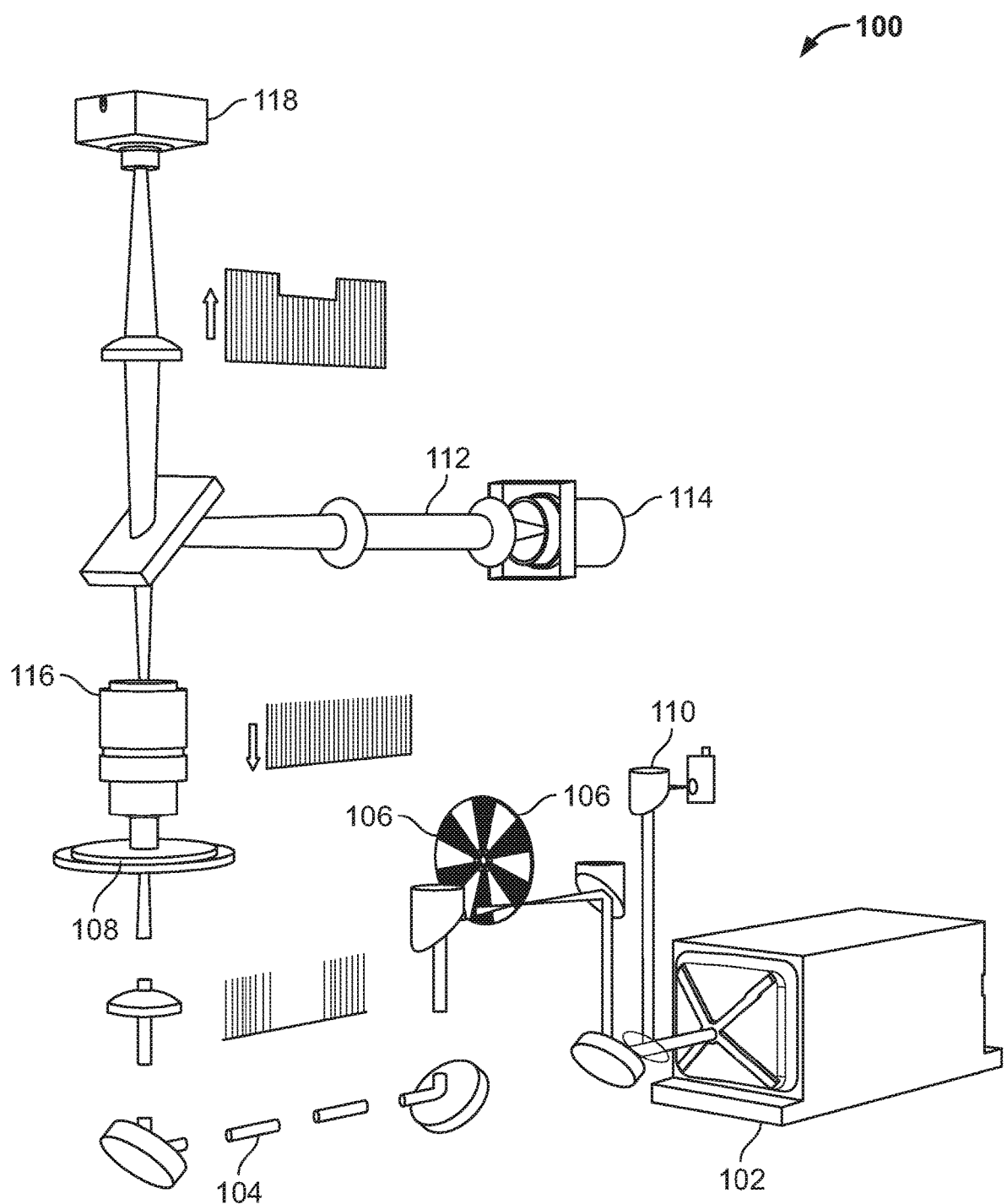
FIG. 1 is a schematic view of a system for rapid widefield photothermal sensing (WPS) according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Embodiments described herein solve the problem of increased resolution, across a widefield sample, and usable in an aqueous environment. In various embodiments, a non-contact probe, such as a visible laser, can reduce the limits on sample preparation, and provide higher imaging speed. We have developed a mid-infrared photothermal (MIP) microscope using a visible laser to probe the IR absorption induced thermal lensing effect in the sample, providing chemical imaging capability with sub-micrometer resolution and depth resolution, which fills the gap between FTIR and AFM-IR microscopy. When the IR wavelength is tuned to the absorption peak of the sample, the co-propagated probe beam will change its divergence due to the thermal-induced local refractive index change. This technique has been successfully used to demonstrate chemically-selective imaging of live cells and organisms. For non-transparent samples, a backward-detected photothermal microscopy can facilitate chemical mapping of active pharmaceutical ingredients and excipients of drug tablets.

In the following disclosure, a widefield photothermal sensing (WPS) microscopy is provided that allows ultrafast chemical imaging at a speed up to 1250 frames per second. To enable high-throughput detection of IR absorption, a multi-element photodetector, such as a camera, is required. However, generic cameras are not fast enough to resolve the transient thermal process at the microsecond level, i.e. one million frames per second. To achieve high temporal resolution using regular cameras, time-gated detection using pulsed light was demonstrated for mapping electronic currents in integrated circuits. This concept can be used to build a virtual lock-in camera, where the frames are synchronized to the probe pulse and the IR pulse at the same repetition rate with precisely-controlled time delays. In an embodiment, a method enables time-resolved imaging of the transient thermal process using a regular camera, with a temporal resolution determined by the probe pulse width.

In another embodiment, to enable efficient delivery of the IR laser to the sample and reflection of the probe photons to the camera, silicon wafers are used as substrate, due to their transparency in the IR window and high reflectance of in the visible wavelengths. The silicon substrate further enhances the WPS signal by accelerating the dissipation of heat. Silicon has high thermal conductivity (150 Wm 1K 1) compare to other IR transparent materials such as CaF2 (10 Wm 1K 1), which avoids heat accumulation and allows faster imaging. Collectively, these embodiments enable ultrafast detection of IR-induced photothermal signals in a widefield manner.

FIG. 1 is a schematic view of a system 100 for rapid widefield imaging, according to an embodiment. As shown in FIG. 1, system 100 includes a nanosecond mid-IR laser 102 that generates a beam 104 that is sent through an optical chopper 106 and weakly focused on a sample 108. The IR beam 104 is partially sampled with a CaF2 plate P and sent to a mercury cadmium telluride (MCT) detector 110.

Simultaneously, a probe beam 112 is provided by a 450-nm LED 114, which is imaged to the back aperture of an imaging objective 116 by a 4-f lens system and a 50:50 beam splitter (BS). The sample-reflected light is collected by the objective 116 and sent to an image sensor 118 with a corresponding tube lens. Gold mirror GM, off-axis parabolic mirror OAPM, and lens L cooperate to direct the probe beam 112 and pump beam 104 to the appropriate locations.

While it will be understood by those of ordinary skill in the art that various alternatives could be used, the pump source shown in FIG. 1 is provided by a mid-IR optical parametric oscillator (Firefly-LW, M-Squared Lasers) with a repetition rate of 20 kHz and pulse width around 34 ns, tunable from 1175 to 1800 cm-1 (8.51 m to 5.56 m), in the fingerprint region. A CaF2 plate may be used to pick off a part of the IR beam and send it into a mercury cadmium telluride (MCT, PVM-10.6, Vigo System) detector. Because a conventional camera does not have sufficient shutter speed to catch each single pulse response, an optical chopper (MC2000B-EC, Thorlabs) is added to modulate the pump pulses, as indicated by the schematics of the pump pulse train and the probe pulse train depicted adjacent the corresponding beams 104 and 114 in FIG. 1.

In this particular embodiment, as depicted in the pulse train schematics, the pump pulse is modulated with eight pulses on followed by eight pulses off. The chopper of FIG. 1 is therefore working under 1250 Hz with the duty cycle of 50%. In alternative embodiments, using conventionally available cameras with typical shutter speeds, the frequency of the duty cycle can be anywhere between about 25% to 75%. To reduce the rise and fall time of pulses at the edge of chopper blade, a gold-coated off-axis parabolic mirror (OAPM) with focal length of about 101.6 mm may be used to focus the pump beam at the blade. An appropriate focal length may be selected for the moderate focal spot size and ease of adjustment consider strong astigmatism if misaligned. Another OAPM with the same focal length was set up to collimate the IR beam. The modulated pump beam was guided by gold mirrors and then weakly focused on the sample using a CaF2 meniscus lens. Different samples were imprinted on silicon wafers using spin coating.

The visible probe beam may be provided by a high-power light emitting diode (LED) working under pulsed operation mode (UHP-T-SR, Prizmatix). In alternative embodiments, other light sources could be used. Due to the transient nature of the thermal diffusion process, the LED output may be pulsed at sub-microsecond level to obtain the time-resolved signal. The central wavelength of the LED is 450 nm and the spectral width is 22.6 nm in the embodiment shown in FIG. 1, though in alternative embodiments the central wavelength and spectral width of the LED 114 could be different wavelengths and widths. The LED 114 shown in FIG. 1 was imaged on the back focal plane of the objective (SLMPLN Olympus, 20×, NA 0.25, 440 Leica, 40×, NA 0.66) through a pair of 4-f lens and 50:50 plate beam splitter, though one of ordinary skill in the art will recognize that alternative objectives and cameras could be used. The sample may be illuminated by the parallel beam and the field of view was 136 μm by 108.8 μm for the 20× objective. The sample-reflected light may be collected by the same objective and traveled back through the beam splitter to be imaged on a complementary metal oxide semiconductor (CMOS, IL5, Fastec Imaging) by a tube lens system. In one embodiment, the camera shutter speed can be set to 2500 frames per second at the abovementioned field of view.

Figure 2A:
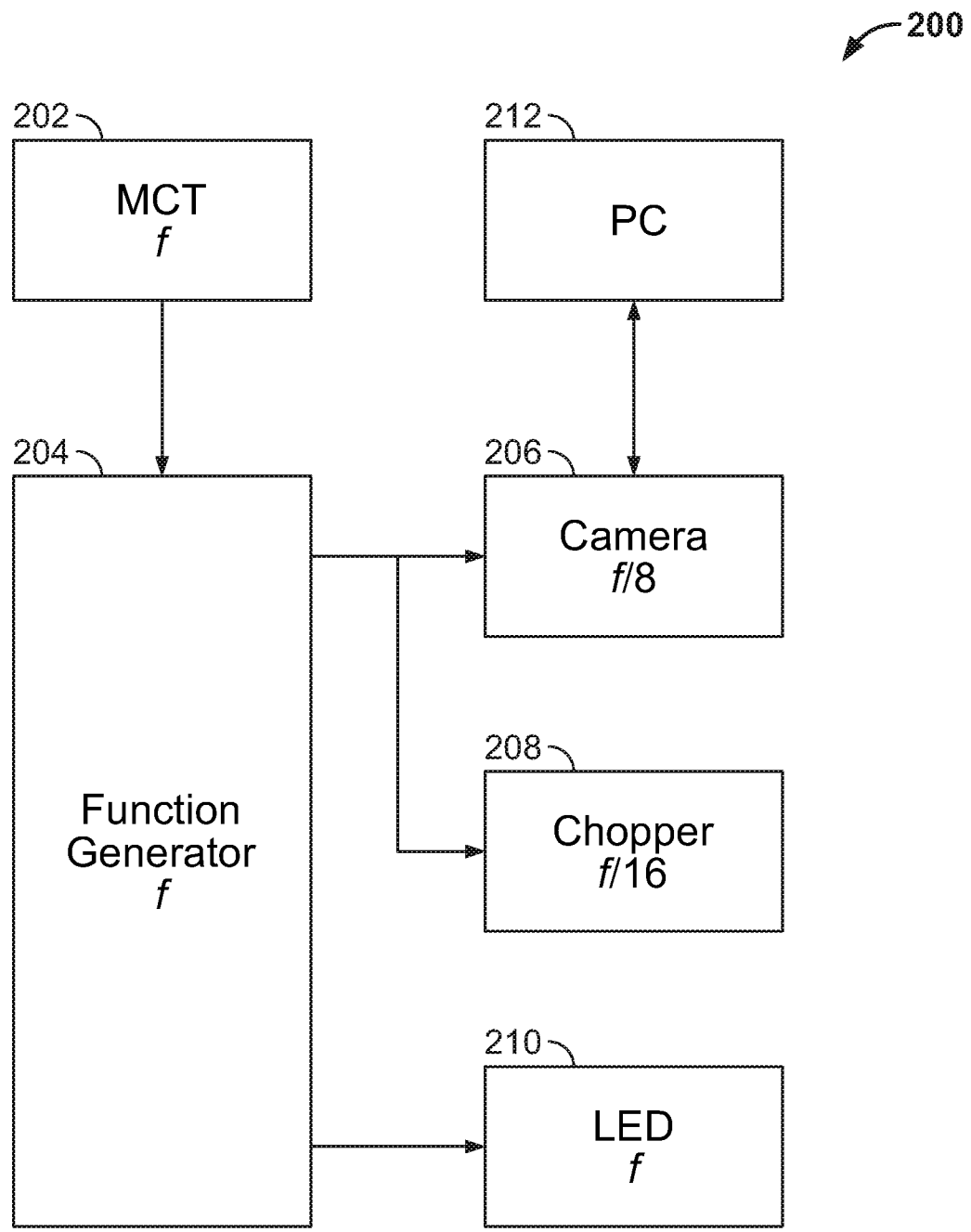
FIG. 2A is a block diagram of a more generic WPS system according to an embodiment.

FIG. 2A is a block diagram of a more generic WPS system 200. An MCT detector 202 is used to capture the IR laser pulses to generate the master clock rate f at the repetition rate of the IR laser to trigger the function generator 204, which sends square wave triggers to the camera 206, chopper 208, and LED 210. The internal frequency divider of the camera 206 is set to expose at f/8 frames per second. The chopper 208 divides the trigger pulses by 16 to modulate the pump source (see FIG. 1). A computer 212 is used to control the camera 206 and store the data.

Figure 2B:
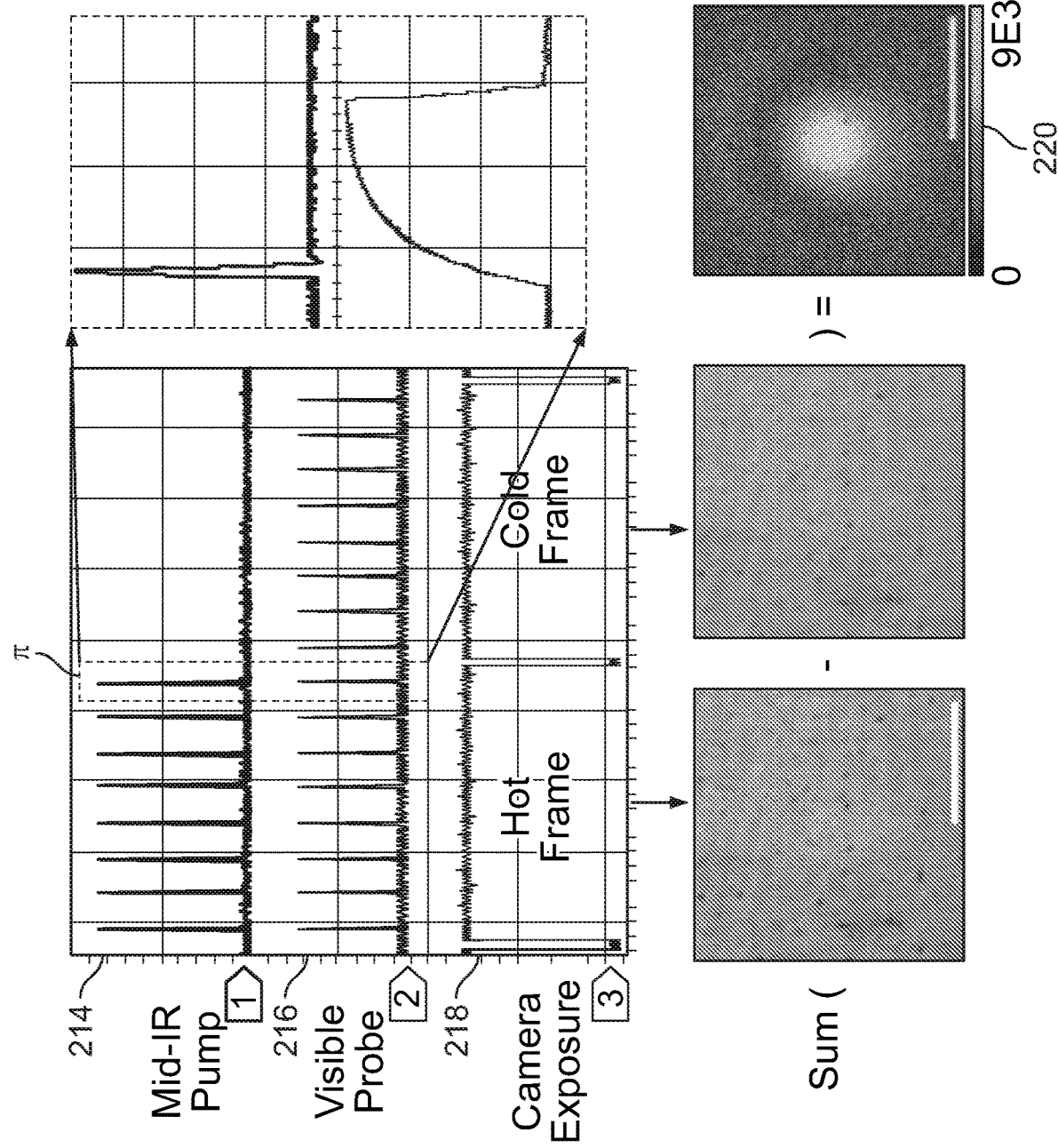
FIG. 2B is a schematic view of the treatment of data acquired using the system depicted in FIG. 2A.

FIG. 2B is a schematic view of the treatment of data acquired using the system depicted generally in FIG. 2A. As shown in FIG. 2B, mid-IR pump signal 214, and visible probe signal 216 are applied to a sample in coordinated pulses. Within each particular pulse, e.g., pulse π, the sample is heated by a short exposure to the mid-IR pump source, as shown in the exploded view indicated by arrows. During pulse π, the visible probe signal is affected by the heating of the sample.

As shown by the downward-pointing arrows, a camera exposure captures the net visible signal over a first set of eight pulses π (indicated as the "hot frame" in FIG. 2B) and a second camera exposure captures the net visible signal over a second set of eight pulses π (indicated as the "cold frame" in FIG. 2B). The difference 220 between those two net exposures provides an indication of the net photothermal effect within the sample.

Timing control is critical for various embodiments of the technique as the difference between the two states is measured. If the pump and probe pulses are not locked to each other, the camera would capture random pulse numbers or pulses at different thermal relaxation state, which may cause incorrect results to be measured.

In one embodiment of FIGS. 2A and 2B, an MCT detector captured the mid-IR pulse train directly from the IR laser port as clock and its output was connected to a two-channel function generator (AFG1062, Tektronix) as the external trigger. One channel served as the LED trigger while the other was used to synchronize the camera and the optical chopper. These two channels were set to generate square waveforms with the frequency equal to the laser repetition rate and pulse width adjustable for different experimental conditions. The relative time between an individual mid-IR pulse and its following visible pulse is defined as time delay, which is a common notation in pump-probe technique, and it may be controlled by changing the phase delay of the function generator output relative to the external trigger inputs. The camera provides a frequency division function that enables exposing under 2500 Hz with 20 kHz external trigger frequency. Furthermore, the optical chopper frequency was locked to the camera exposure period.

To verify the timing configuration, another MCT detector was installed after the optical chopper to monitor the pump and a Si PIN photodiode was coupled into the probe beam path. An example set of waveforms was recorded with an oscilloscope shown in FIG. 2B. The pump-probe delay was pre-measured with an oscilloscope and noted as the reference for follow-up experiments. The delay was tuned using the function generator marked with phase shift in degrees. The entire 360° cycle corresponds to the pump pulse period of 50 μs.

In one embodiment, every one of eight visible pulses trigger the camera to start exposing a new frame and therefore each captured frame is synchronized and contains exactly eight visible pulses. This lock-in detection scheme is the foundation for accurate data acquisition. The images with mid-IR pulses are defined as 'hot' frames since the temperature would increase due to absorption, and those without mid-IR pulses are defined as 'cold' frames. As a result, the final image stack is the difference 220 between hot and cold frames, shows a zoom-in image of the pump and probe delay. By shifting the delay, the thermal dissipation profile was mapped.

Figure 3:
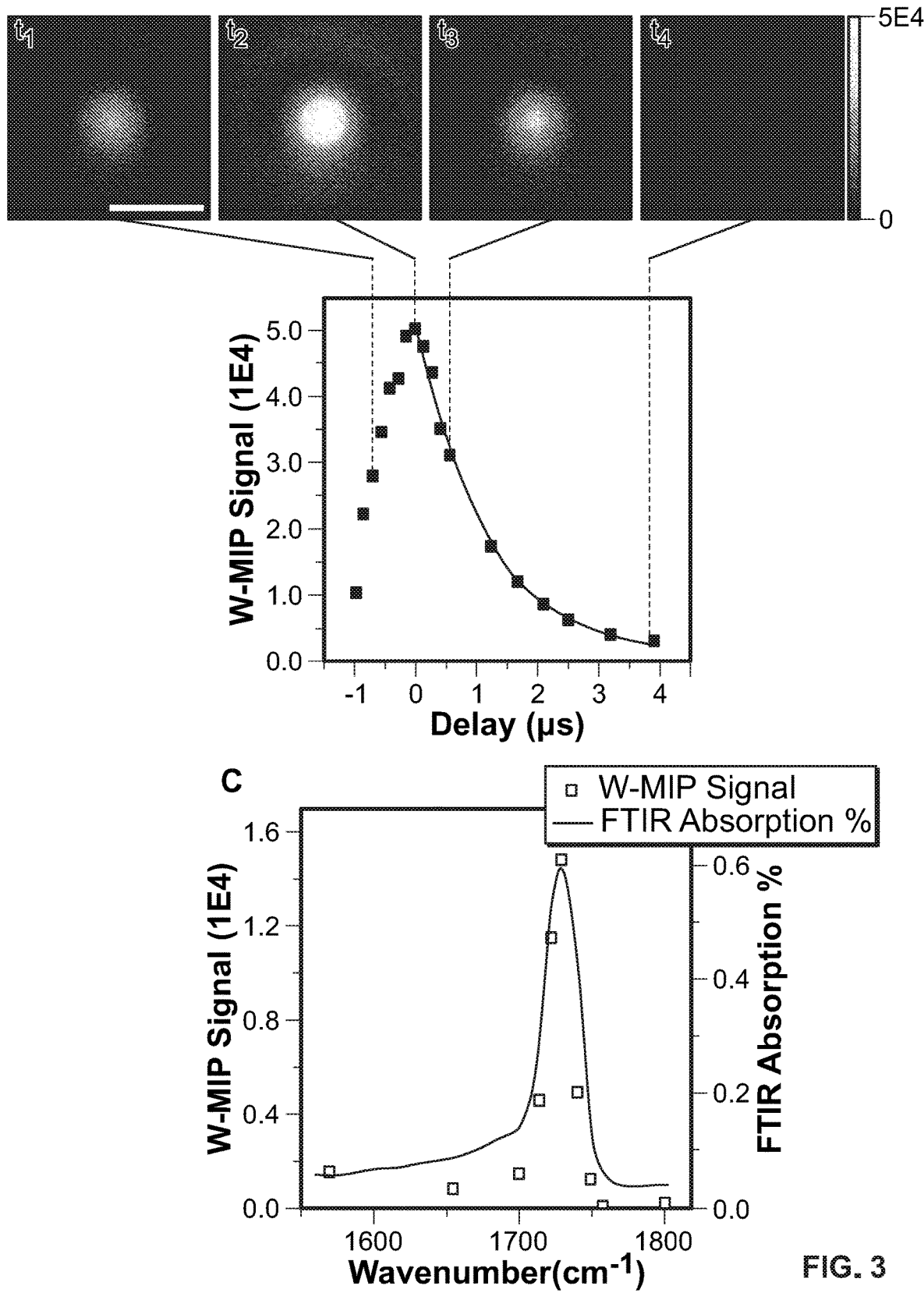
FIG. 3 depicts imaging of a particular sample at four time delays $t_1$, $t_2$, $t_3$, and $t_4$.

FIG. 3 depicts imaging of a particular sample at four time delays $t_1$, $t_2$, $t_3$, and $t_4$. The sample that was used to generate the images shown in FIG. 3 is a 486-nm thick sample of poly methyl methacrylate (PMMA).

To characterize the temporal resolution, time-resolved WPS imaging was performed on the PMMA film on a silicon substrate. An IR pump was tuned to 1728 cm-1, the C=O absorption peak in PMMA. The probe width was 914 ns and each image was acquired at the speed of 2 Hz. The pump and probe power at the sample were around 5.1 mW and 1.6 mW. By subtracting the cold frames by hot frames as described above with respect to FIGS. 2A and 2B, WPS imaging at various delays were acquired. The bright spot in the center of field of view in the time delays $t_1$, $t_2$, $t_3$, and $t_4$ corresponds to the weakly focused IR spot. The signal intensity at the center of each image was used to plot the temporal profile of WPS signal, with time delay ranging from −0.97 μs to 3.89 μs. The data points were well fitted into an exponential decay $e^{-t/\tau}$, where t is the time delay and τ=1.1 μs is the decay constant, indicating a fast cooling time. Note that the decay constants should not be confused with temporal resolution, which is determined by the probe pulse width, i.e. 914 ns, in WPS, limited by the LED.

In various embodiments, the spectral fidelity of our WPS microscope can be improved. The pump wavelengths are swept at the fixed time delay, where the WPS signal was maximized. The raw spectrum was normalized by the pump power. The curve was the reference FTIR spectrum measured with a commercialized FTIR spectrometer. As shown in FIG. 3, a good agreement was obtained between the two measurements.

Figure 4A:
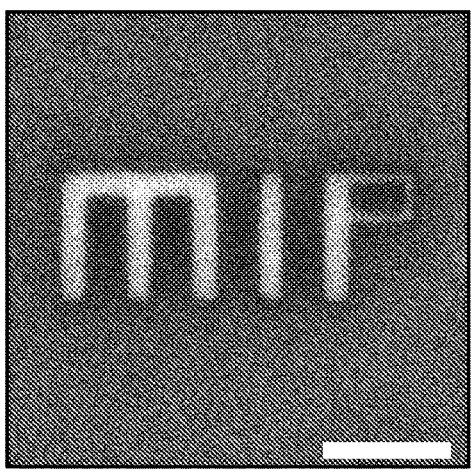
FIGS. 4A-4F depict WPS imaging patterns of polymer film and beads.
Figure 4B:
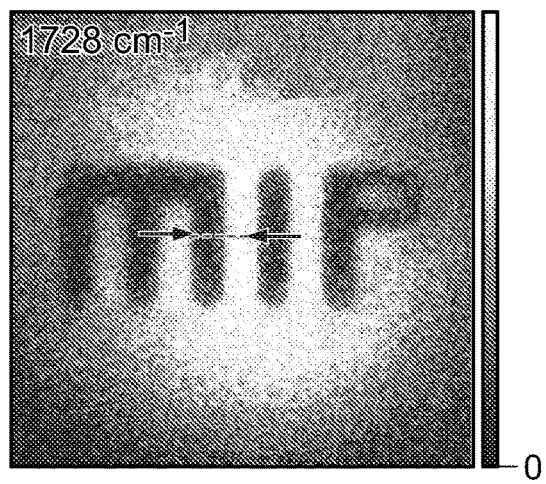
Figure 4C:
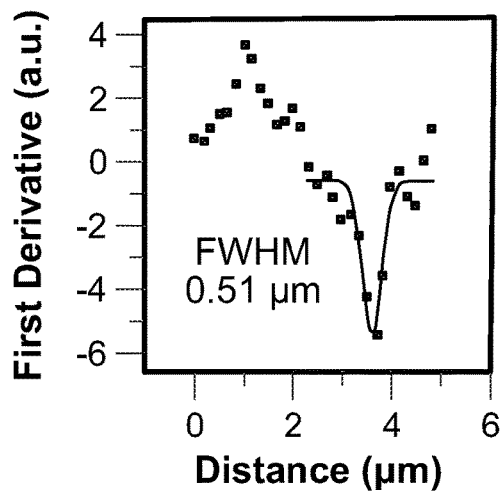

In order to evaluate the spatial resolution, WPS imaging of polymer film patterns and beads were performed as shown in FIGS. 4A-4F. FIG. 4A shows a reflection image of the pattern, where the etched-off parts showed higher reflectivity. FIG. 4B shows a WPS image of the same area. FIG. 4C shows a first derivative of the intensity profile along the line shown in FIG. 4B as squares. Gaussian fitting (red line) showed an FWHM of 0.51 μm.

Figure 4D:
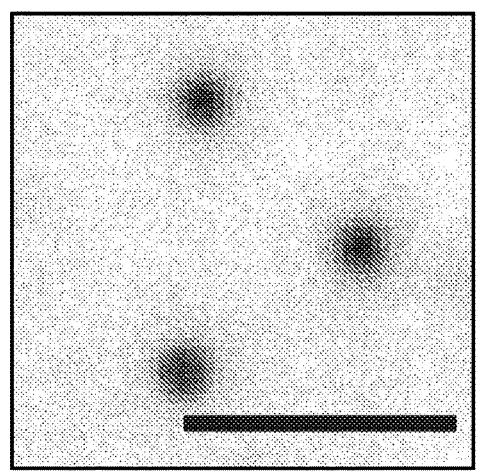
Figure 4E:
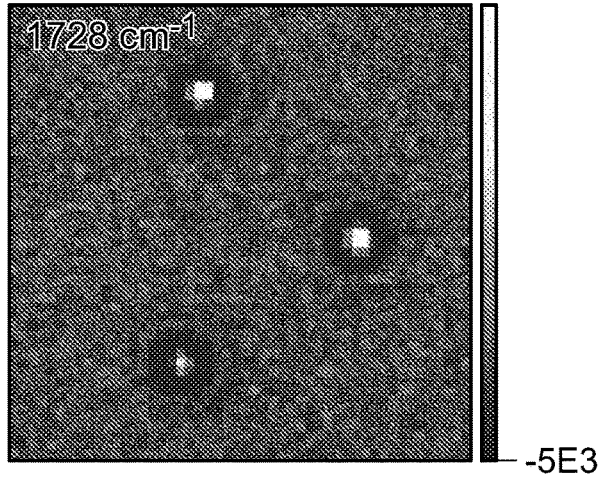
Figure 4F:
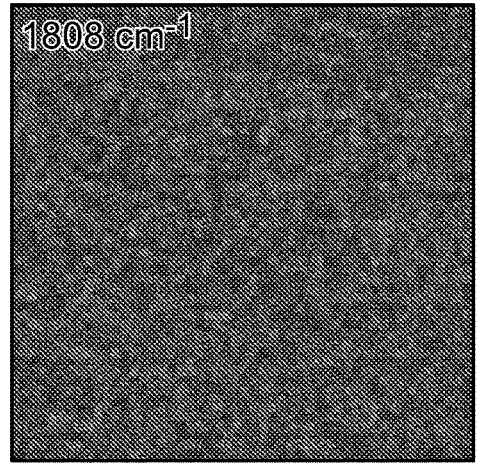

FIG. 4D shows a reflection image of 1 μm PMMA particles. FIG. 4e shows a WPS image of the same area with the pump at 1728 cm-1. FIG. 4F shows off-resonance image depicting no contrast.

The 'MIP' letters of FIGS. 4A-4C were etched off a PMMA film around 310 nm thick using electron-beam lithography and the bare silicon showed higher reflectivity compared to the rest areas. The widefield reflection image is shown in FIG. 4A. The letter 'I' was 2 μm in width and 10 μm in length. WPS imaging of the pattern was acquired within 0.5 s with a cold frame minus a hot frame, showing clear contrast at the etching boundaries (FIG. 4B). An intensity profile along the line was extracted, as indicated in FIG. 4B. Nine adjacent lines were averaged to perform first derivative (FIG. 4C). The theoretical value for optical resolution with 0.66 NA objective and 450 nm illumination is calculated to be 0.42 μm. The Gaussian fitting result showed a full-width-half-maximum (FWHM) of 0.51 μm, indicating a sub-micrometer resolution, which is consistent with the calculated value.

To test the detection limit of the WPS microscope, the WPS signal was measured at different thickness with fixed pump-probe delay. As a result, the minimal detectable thickness was around 159 nm, which is about an order smaller compared with the typical confocal Raman microscopy. Notably, the detection limit is comparable with the AFM-IR technique and can be improved by coupling low-noise cameras.

To demonstrate the capability of imaging micro-particles, WPS imaging of 1 μm PMMA beads was performed. The reflection image of beads on silicon wafer is shown in FIG. 4a. Although the magnification of the system was not well optimized for such small particles, the images still has sufficient pixels for each bead. WPS imaging of the same area was acquired with the signal averaged for 0.5 s (FIG. 4B). Individual beads were clearly resolved at the PMMA C=O peak at 1728 cm-1, while no contrast was shown at the off-resonance wavelength at 1808 cm-1 (FIG. 4E,F). Here, for consistency, the same settings are used for WPS imaging. Note the field of view is only about a quarter of the previous "MIP" pattern in FIG. 4A-C, which potentially provides four times increase in imaging speed without any changes of the instruments.

FIG. 5 shows ultrafast chemical imaging of a nanoscale film at the shot noise limit. Double-side polished silicon wafers with the thickness of 100 μm were used as the substrates in film and pattern imaging. The silicon wafers were cleaned through multiple steps of solvent rinse, in the sequence of toluene, acetone, isopropanol and deionized water, followed with O2 plasma (300 sccm O2 flow rate, 300 W and 15 minutes) before the spinning coating process. To fabricate the PMMA films, PMMA 950 A4 solution was spin-coated onto the cleaned silicon wafer, at a speed of 1000 rpm/s for 45 s. After soft-baked at 180° C. for 5 minutes, the film thickness was measured by an ellipsometer. To fabricate the pattern, PMMA 950 A4 solution was spin-coated onto the silicon wafer at a speed of 4000 rpm/s for 45 s to get the electron beam resist layer. After soft-baked at 180° C. for 5 minutes, the "MIP" patterns were fabricated onto the PMMA layer with electron-beam lithography using a Zeiss Supra 40 VP SEM equipped with an e-beam blanker and through subsequent development with methyl isobutyl ketone/isopropanol solvent mix (1:3 in volume).

Figure 5A:
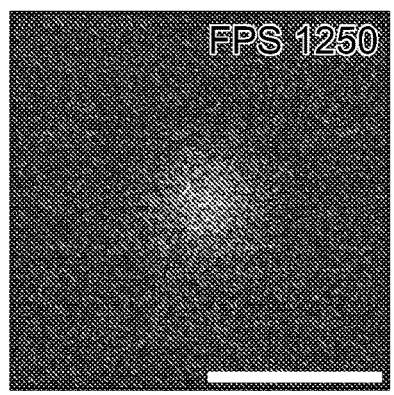
FIG. 5A-5F show ultrafast chemical imaging of a nanoscale film at the shot noise limit.
Figure 5B:
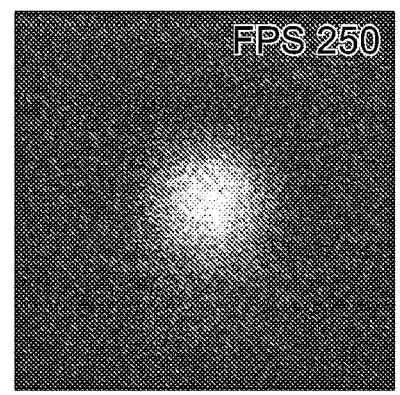
Figure 5C:
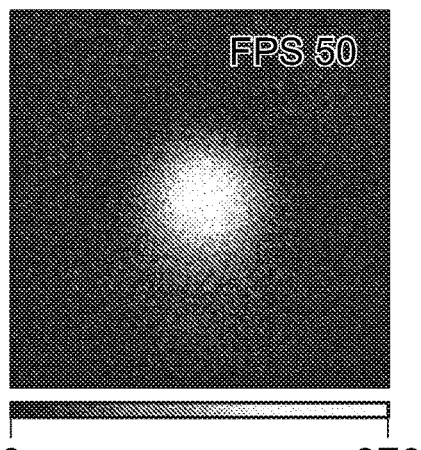
Figure 5D:
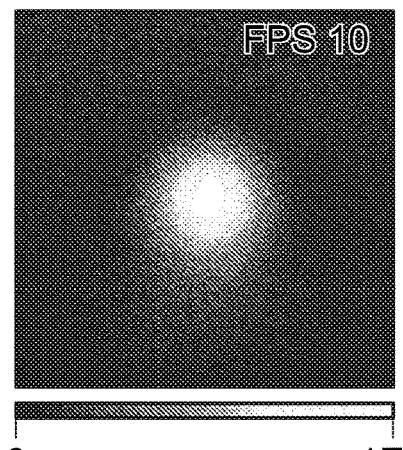
Figure 5E:
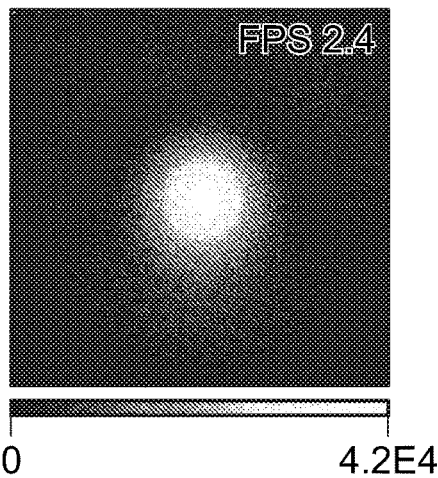
Figure 5F:
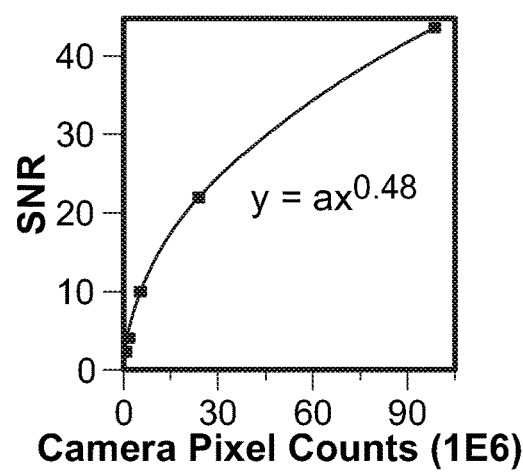

WPS imaging of a thin PMMA film (around 486 nm) was demonstrated and the signal to noise ratio (SNR) as a function of imaging speed was evaluated. A total of 1054 frames was captured in 410 ms (i.e., 0.39 ms exposure time per frame), with a field of view of 136 μm by 108.8 μm. This results in a WPS imaging speed of 1250 frames per second. For noise measurement, a reference experiment was performed with the pump turned-off. Therefore, the subtracted results were pure noise from the camera and the probe photon fluctuation. The SNR was calculated from the center region (25 pixels) by the ratio of the mean difference between signal and reference to the standard deviation of the noise. FIG. 5A shows a single frame from the time trace, with the SNR calculated to be 2.3. Notably, the single frame chemical image was based on only eight IR pump pulses. To further improve SNR, frame averaging was used as a trade-off of imaging speed (FIGS. 5B-E). The SNR of each frame was measured and calculated, and the results were fitted with a power function (FIG. 5F). The solid curve was the fitting result of different accumulating frames. The exponent term was 0.48, close to the theoretical limit of 0.5, indicating the set-up has been optimized for working near shot-noise limit. The signal intensities were relatively stable during the 0.42 seconds recording period, implying no sign of sample damage or photobleaching.

FIG. 6 shows live cell imaging by a WPS microscope according to an embodiment. The SKVO3 cells shown in FIG. 6 were cultured on a double polished silicon wafer for 24 hours. The cells were moved to microscope for immediate imaging after washed off cell culture medium and rinsed with PBS for 2 times.

Figure 6A:
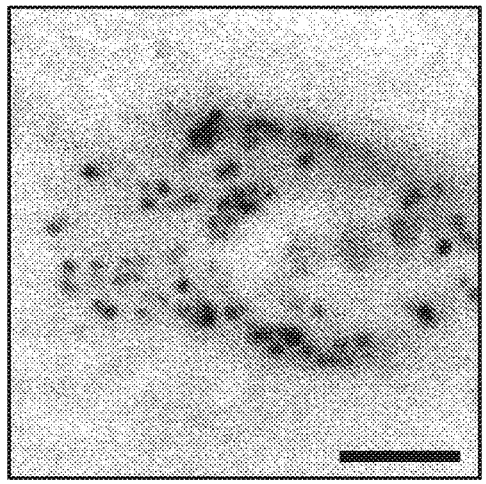
FIGS. 6A-6D show live cell imaging by a WPS microscope according to an embodiment.
Figure 6B:
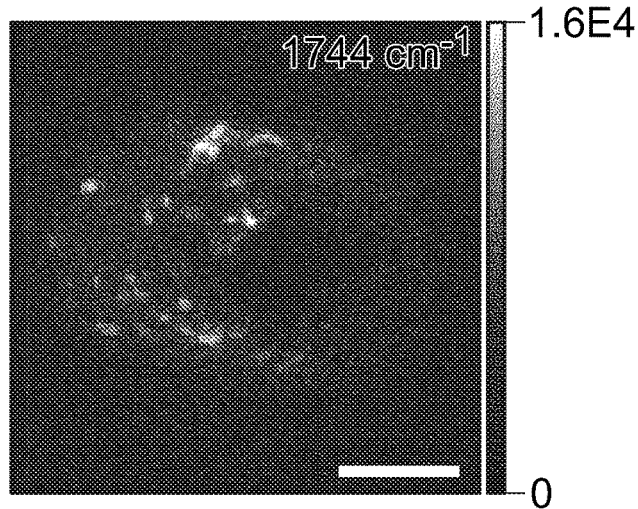
Figure 6C:
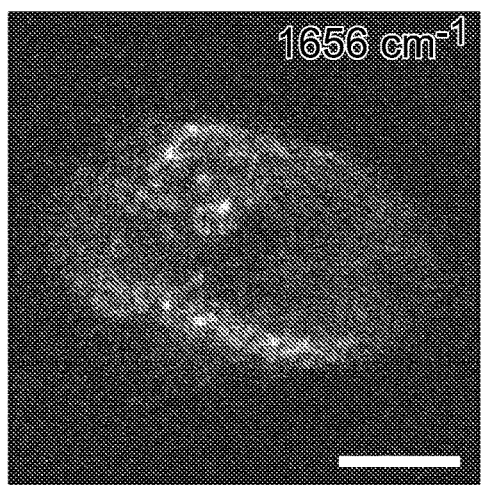
Figure 6D:
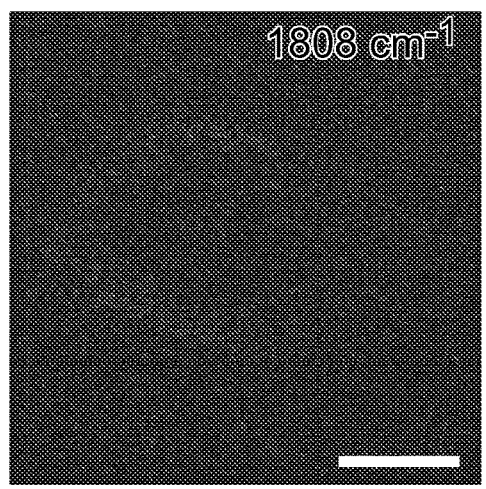

To demonstrate the capability of WPS microscopy for biological samples, WPS imaging of living SKVO3 human ovarian cancer cells was performed. FIG. 6A shows the reflection bright field image, showing a cell with lipid droplets around the nucleus. The WPS image at 1744 cm-1 shows the distribution of lipid droplets, where individual droplets co-localize with the reflection image and no obvious signal showed up at the nuclei area (FIG. 6B). By tuning IR to 1656 cm-1 of protein amide I band, the protein contents emerged to the contrasts in FIG. 6C. The proteins are more uniformly distributed in the cells compared to the lipid droplets. There is some residual absorption of water at this wavelength, which was not observed as no contrast was shown in the medium region outside the cell. This lack of contrast from water is due to the large heat capacity of water, resulting in a minimal change in temperature. Consequently, when tuned IR to the off-resonance wavelength at 1808 cm-1, no contrasts were observed (FIG. 6D). For consistency in instrument, the same field of view was used for cell imaging, at a speed of 2 Hz. The final images were cropped to 40 μm by 40 μm for better visualization. Taken together, these data highlight the capability of imaging chemical components inside living cells with high speed.

In various embodiments, a WPS microscope probes the thermal-induced reflectivity change with a camera through lock-in detection. The time-resolved mapping of heat dissipation was made possible by synchronization of frame capture with modulated IR pump and pulsed visible probe. Given the results of sub-microsecond temporal resolution, ultrafast chemical imaging speed (up to 1250 frames per second) and sub-micrometer spatial resolution, these techniques can provide a new way to study highly dynamic processes with motion-blur-free observation. Various embodiments may open a door for reagent-free, high-throughput screening for fields ranging from pharmaceutical industry to cell biology. Another potential application is to differentiate the chemical and morphological features of a sample based on the signal level and decay speed, which directly linked to the properties such as absorption coefficient.

There is still plenty of room to improve the performance of the WPS system. To further boost the imaging speed, a camera with high well depth pixels can be adopted. Because the WPS signal comes from small AC signals on top of a strong DC background, increasing the full well capacity of the image sensor helps to reduce the averaging time. The current camera provides a dynamic range of 58 dB with a full well capacity of 19 ke– and dark noise of 23 e–. As an example, the commercialized camera (Q-2HFW-CXP, Adimec) has 2 million full well capacity and 63 dB dynamic range, which can be used to increase the speed by 10 times while maintaining the same SNR level. Furthermore, denoising methods can be applied to further remove the noise in the X-Y-time data cube.

In one embodiment, counter-propagation can be used to detect properties of thin or relatively transparent samples. To broaden the applications, a co-propagation scheme may be used, in which the IR and visible beam travels towards the same direction, leaving space for thick samples. Previous work in backward-detected MIP has demonstrated the implementation of co-propagation with the IR and visible beam sharing the objective. To separate the optical elements for IR and visible, oblique illumination of IR beam is an attractive option.

For chemical images of nano-sized particles in biological or pharmaceutical environment, rigorous designs of the substrate and the embedding medium may be needed. The bi-layered substrate of Si and SiO2 structure has successfully been used in the interferometric reflectance imaging sensor to probe biomass accumulation and single virus. Hence, by comparing the interference intensity at hot and cold states, biological nanoparticles with chemical specificity can be potentially mapped.

Figure 7:
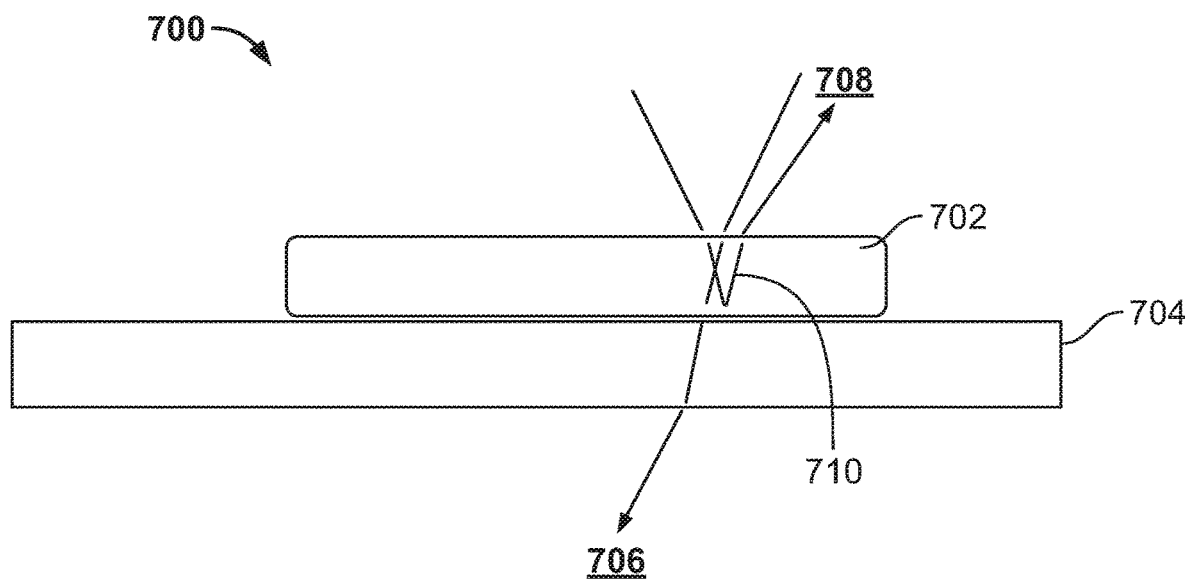
FIG. 7 is a schematic view of a sample on a substrate according to an embodiment.

FIG. 7 is a simplified cross-sectional view of a system 700 including a sample 702 arranged on a substrate 704. The substrate, as described above, provides additional advantages over conventional systems in that it is made of a material such as silicon that is relatively inexpensive, easy to manufacture, and has optical and mechanical properties that provide benefits for photothermal spectroscopy.

FIG. 7 further depicts an infrared beam 706 and a visible beam 708 incident on the sample 702. At intersection 710, the infrared beam 706 and visible beam 708 intersect and a measurable photothermal effect may be detected by the deflection of the returned visible beam 708. In conventional systems, the returned light could include both visible and infrared signal, and separating these signals could be difficult or introduce error into the measurement. However, because substrate 704 is made of a material that is nearly transparent to infrared light, that signal is largely not returned.

Similarly, if the substrate 704 in a conventional system were to be transparent to visible light then the returned signal would not include some of the desired response information regarding the photothermal effect. Silicon and other materials that are highly reflective to visible light provide a benefit in that the signal is not lost in this way.

Substrate 704 is arranged proximate to intersection 710 such that photothermal signal is not lost, while unwanted infrared light and heat are transmitted away from intersection 710 through substrate 704. Substrate 704 can be made of material with high heat conductivity, which improves the speed of cycling of the photothermal effect that can be measured.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A system for widefield imaging of infrared absorption properties of a sample using a photothermal effect, the system comprising:
    an infrared pump source configured to generate an infrared pump beam;
    a probe source configured to generate a probe beam;
    at least one pulse generator configured to initiate a series of synchronized pulses of the infrared pump beam and the probe beam;
    an image sensor configured to collect:
        a hot frame comprising a spatially-resolved image of probe light collected from the sample with the infrared pump beam intersecting the probe beam at the sample; and
        a cold frame comprising a spatially-resolved image of probe light collected from the sample with a reduced intensity of the infrared pump beam intersecting the probe beam at the sample; and
        a processor configured to measure a change between the hot frame and the cold frame to simultaneously generate a plurality of signals indicative of a level of infrared absorption at each of a corresponding plurality of spatially-resolved points on the sample.

2. The system of claim 1, wherein the at least one pulse generator is further configured to direct a timing and a frequency of operation of the infrared pump source and the probe source.

3. The system of claim 2, wherein the image sensor is controlled via the processor with a time-gated lock-in to the frequency of operation of the infrared pump source and the probe source.

4. The system of claim 1, wherein the at least one pulse generator is electronically coupled to the image sensor and the probe source to control a frequency of operation of the image sensor and the probe source.

5. The system of claim 1, wherein the at least one pulse generator is configured to provide a relative delay between pump beam pulses and probe beam pulses.

6. The system of claim 5, wherein the relative delay is adjusted to substantially maximize the plurality of signals indicative of the level of infrared absorption of the sample.

7. The system of claim 5 wherein the plurality of signals indicative of the level of infrared absorption are measured at a plurality of relative delays.

8. The system of claim 7 wherein the plurality of signals indicative of the level of infrared absorption measured at the plurality of relative delays include a decay constant of the sample.

9. The system of claim 1, wherein the infrared pump source is a tunable quantum cascade laser.

10. The system of claim 1, wherein the infrared pump source is a nanosecond mid-IR laser.

11. The system of claim 1, wherein the probe source is one of a visible light source or a UV light source or an LED.

12. The system of claim 1, wherein the system is capable of use in a reagent-free, high-throughput screening for a pharmaceutical property or a cell biology property.

13. The system of claim 1, wherein the system is configured to differentiate a chemical feature or a morphological feature of the sample, wherein the chemical feature or the morphological feature is directly linked to a property such as an infrared absorption coefficient.

14. The system of claim 1, further comprising an objective configured to focus the probe beam to intersect the infrared pump beam at the sample and to receive a reflected probe light from the sample that is routed to the image sensor.

15. The system of claim 1, wherein the processor is configured to measure a difference between a second signal and a first signal by subtracting the second signal from the first signal, or by subtracting the first signal from the second signal.

16. The system of claim 1, wherein a power of the infrared pump beam can be modified by the processor to modulate between the hot frame and the cold frame.

17. The system of claim 16 further comprising a chopper, wherein the infrared pump beam is configured to be modulated with the chopper.

18. The system of claim 1, wherein the reduced intensity of the infrared pump beam is substantially zero in the cold frame.

19. The system of claim 1, wherein the at least one pulse generator is configured to control a frequency of operation of each of a pump pulse train, a probe pulse train, and the image sensor.

20. The system of claim 1 wherein the probe beam and the infrared pump beam illuminate the sample from a same side of the sample.

21. The system of claim 20 further comprising an objective configured to focus both the probe beam and the infrared pump beam to intersect at the sample and to receive a reflected probe light from the sample that is routed to the image sensor.

22. The system of claim 1, wherein the infrared pump source is configured to modify the probe light collected by the image sensor by generating the photothermal effect at the sample.

23. The system of claim 1, wherein the infrared pump beam has a pulse period less than 100 μs, more preferably less than 75 μs, and even more preferably less than 50 μs.

24. A method for measuring infrared absorption properties over a wide area of a sample using a photothermal effect, the method comprising:
provide an infrared pump pulse train;
providing a probe pulse train synchronized with the infrared pump pulse train;
collecting, from the sample, by an image sensor, a hot frame, wherein the hot frame includes a spatially-resolved image of probe light collected from the sample with the infrared pump pulse train intersecting a probe beam at the sample;
collecting, from a substrate, by the image sensor, a cold frame, including a spatially-resolved image of probe light collected from the sample with a reduced intensity of the infrared pump pulse train intersecting the probe pulse train at the sample; and
measuring a change between the hot frame and the cold frame to detect the photothermal effect by simultaneously generating a plurality of signals indicative of a level of infrared absorption at each of a corresponding plurality of spatially-resolved points on the sample.

25. The method of claim 24, wherein a pulse generator is configured to synchronize the infrared pump pulse train and the probe pulse train, and wherein the pulse generator is further configured to trigger the image sensor at a frequency based upon a frequency of the infrared pump pulse train and a frequency of the probe pulse train.

26. The method of claim 24, wherein a pulse generator is electronically coupled to the image sensor and a probe source to control a frequency of operation of the image sensor and the probe source.

27. The method of claim 26, wherein the pulse generator is further coupled to one of a chopper and a pump source to control a frequency of the infrared pump pulse train.

28. The method of claim 26, wherein the pulse generator is further configured to control the frequency of operation of each of the infrared pump pulse train, and the probe pulse train.

29. The method of claim 26, wherein a detector is used to capture IR laser pulses of the pump pulse train to generate a master clock rate.

30. The method of claim 29, further comprising using the pulse generator to send a series of trigger pulses at a frequency f that is a function of the master clock rate such that:
probe beam pulses are generated at the frequency f;
the image sensor is triggered to capture a frame at a frequency f/n;
a power of the infrared pump pulse train is modulated generated at a frequency f/2n, where n is an integer.

31. The method of claim 30 wherein a power of the infrared pump pulse train is modulated with a chopper.

32. The method of claim 24, wherein a level of absorption of infrared light by the sample from the infrared pump pulse train modifies the probe light collected by the image sensor due to the photothermal effect of the sample.

33. The method of claim 24, wherein a processor is configured to measure a difference between a second signal and a first signal by subtracting the second signal from the first signal, or by subtracting the first signal from the second signal.

34. The method of claim 24, wherein the method includes adjusting a relative delay between pump pulse train pulses and probe beam pulses to substantially maximize a signal of the plurality of signals indicative of the level of infrared absorption of the sample.

35. The method of claim 34, wherein the signal of the plurality of signals indicative of the level of infrared absorption is measured at a plurality of relative delays.

36. The method of claim 35, further comprising analyzing the signal of the plurality of signals indicative of the level of infrared absorption measured at the plurality of relative delays to extract a decay constant of the sample.

37. The method of claim 24, wherein the probe pulse train and the infrared pump pulse train co-propagate such that they travel in a common direction toward the sample.

38. The method of claim 24, wherein the hot frame includes a first number of pulses of the probe pulse train, and the cold frame includes a second number of pulses of the probe pulse train.

39. The method of claim 38, wherein the first number of pulses is equal to the second number of pulses.

40. The method of claim 24, further comprising detecting the photothermal effect in an aqueous environment.

41. The method of claim 24, further comprising detecting the photothermal effect in a reagent-free, high-throughput screening of a pharmaceutical or in cell biology.

42. The method of claim 24, further comprising differentiating chemical and morphological features of the sample which are directly linked to properties such as infrared absorption coefficient.

43. The method of claim 24, further comprising using a processor to control the image sensor and a probe source with a time-gated lock-in to a desired frequency.

44. The method of claim 43, wherein a period of the infrared pump pulse train is less than 100 µs, more preferably less than 75 µs, and even more preferably less than 50 µs.

\* \* \* \* \*